United States Patent
Durazzani et al.

[11] Patent Number: 5,907,880
[45] Date of Patent: Jun. 1, 1999

[54] METHOD FOR PROVIDING ACTIVE DAMPING OF THE VIBRATIONS GENERATED BY THE WASHING ASSEMBLY OF WASHING MACHINES AND WASHING MACHINE IMPLEMENTING SAID METHOD

[75] Inventors: Piero Durazzani; Lucio Valent, both of Pordenone, Italy

[73] Assignee: Electrolux Zanussi S.p.A., Pordenone, Italy

[21] Appl. No.: 09/075,306

[22] Filed: May 8, 1998

[30]  Foreign Application Priority Data

May 15, 1997 [IT] Italy .................................. PN97A0029

[51] Int. Cl.$^6$ ...................................................... D06F 37/22
[52] U.S. Cl. .............................. 8/159; 68/12.06; 68/23.1; 188/267; 188/276
[58] Field of Search ...................... 8/158, 159; 68/12.02, 68/23.1, 23.2, 24; 188/276, 267

[56] References Cited

U.S. PATENT DOCUMENTS

| | | | |
|---|---|---|---|
| 3,509,742 | 5/1970 | Bauer | 68/23.1 |
| 3,945,226 | 3/1976 | De Hedouville | 68/23.1 |
| 4,729,458 | 3/1988 | Bauer et al. | 68/23.1 |
| 4,992,190 | 2/1991 | Shtarkman . | |
| 5,070,565 | 12/1991 | Sood et al. | 8/159 |
| 5,207,081 | 5/1993 | Fuse | 68/23.1 |
| 5,230,229 | 7/1993 | Stadelmann et al. | 68/23.1 |
| 5,375,282 | 12/1994 | Dausch et al. | 8/159 |
| 5,520,029 | 5/1996 | Sankar | 68/23.1 |

FOREIGN PATENT DOCUMENTS

| | | | |
|---|---|---|---|
| 2484484 | 12/1981 | France | 68/23.1 |
| 2511401 | 2/1983 | France | 68/23.1 |

*Primary Examiner*—Frankie L. Stinson
*Attorney, Agent, or Firm*—Pearne Gordon McCoy & Granger

[57]  ABSTRACT

A shock absorber damps the vibrations that are generated in a washing assembly of a horizontal axis washer. The shock absorber is of the type containing a magnetorheological fluid. A method carried out in a real-time mode throughout the duration of the operation cycles of the machine varies at least one of the rheological properties of the medium and, in due proportion, the vibration damping power of the shock absorber. The method is based on the monitoring of a physical quantity that is representative of the variations in the balance conditions of the washing assembly. The invention provides effective and immediate damping of the vibrations caused by an unbalanced washload in the rotating drum, without any interruption or modification of the washing cycle selected and set by the user.

8 Claims, 3 Drawing Sheets

METHOD FOR PROVIDING ACTIVE DAMPING OF THE VIBRATIONS GENERATED BY THE WASHING ASSEMBLY OF WASHING MACHINES AND WASHING MACHINE IMPLEMENTING SAID METHOD

BACKGROUND OF THE INVENTION

The present invention generally relates to washing machines, such as household or residential type washers, including both clothes washing machines and combined clothes washing and drying machines.

A washing machine, top-loading or front-loading, typically includes the following parts: an outer casing, with a structural base portion and a control panel; a washing assembly elastically connected with the outer casing (ie, hung on or supported by said casing), and including a tub and a substantially horizontal-axis rotating drum; a drive assembly with an electric motor adapted to operate the drum at a reduced rotational speed (for instance, 50–70 rpm) in the washing phases of the cycle, and at least one higher rotational speed (up to even 1500–1800 rpm in some models) during spin-extraction phases.

During operation, it may quite frequently occur that, in the washing machine, the items making up the washload distribute unevenly, ie. in a non-uniform manner, along the periphery of the rotating drum. As a result, the washing assembly of the machine is subject to stresses that tend to generate vibrations whose amplitudes increase with the rotational speed of the same drum and peak in the transient from washing to spin-extraction in correspondence of a rotational speed which is generally known as the "critical speed". In order to damp these vibrations, so as to prevent them from affecting the outer casing and being further transmitted on to the surrounding environment, in the form of noise or otherwise, the washing assembly is connected to the outer casing by means of springs and shock-absorbing struts.

In consideration of their simple, cost-effective construction, the shock absorbers that are most frequently used in this particular field of application are those of the friction type (see for instance EP-A-0 315 076 and EP-A-0 513 670) which, in view of ensuring a constant vibration-damping capacity thereof, are sized on the basis of standard operating conditions (extent of the stresses imparted, amplitude and frequency of the generated vibrations). These shock-absorbers, however, are "passive", failing to accommodate the fact that the actual operating conditions of the machine in use may differ considerably from standard conditions. In particular, such shock-absorbers have limited effectiveness in the presence of markedly anomalous oscillations, such as those generated by a washload with a reduced, but concentrated weight, as represented for example by a pair of tennis-shoes or a sponge-cloth towel or bathrobe. It should furthermore be noticed that, in these shock absorbers, a vibration damping action is actually performed even when it is not required (washing phases, perfectly balanced washload, etc.), and this may be the cause of a noise that is generally felt as unpleasant or disturbing by the users of the washing machine.

Washing machines are also known, for instance from EP-A-0 407 755, which make use of shock absorbers that are capable of producing a reduced vibration-damping effect in clothes washing phases of the cycle, as well as a second, higher vibration-damping effect in the spin-extraction phases of the process. All of these shock absorbers, considering their substantially "passive" character, have certain drawbacks. In particular, they tend to react with some delay, with an undesired damping peak, to the occurrence of sudden stresses when the amplitude of the oscillations of the washing assembly undergoes sharp variations.

Finally, EP-A-0 487 311 discloses a shock absorber for clothes washing machines that includes a hydraulic cylinder that is fixed to the washing assembly of the machine, and an actuator that is fixed to the outer casing of the washing machine and is triggered by an arrangement provided to control the rotational speed of the drum. A sliding drilled piston is enclosed in the cylinder, along with a fixed perforated partitioning baffle, and the operating rod of the piston protrudes from the cylinder. When the speed control arrangement detects a condition in which the drum is rotating at a low number of revolutions per minute, ie. a low speed, the actuator keeps a therewith associated retaining pin in a seat provided in the rod of the piston so as to damp the oscillations being transmitted by the washing assembly to the outer casing of the machine. When the speed control arrangement then detects a condition in which the rotational speed of the drum rises beyond a pre-determined threshold value, as occurs during the transition from the washing phase to the spin-extraction phase, the actuator retracts the retaining pin from said seat so as to positively interrupt any transmission of vibrations from the washing assembly to the outer casing of the machine. Such a shock absorber, however, apart from requiring close machining and manufacturing tolerances in connection with the retaining pin and the therewith associated seat in the piston rod, has limited reliability due to these two parts unavoidably undergoing considerable wear and tear due to repeated engaging and disengaging actions. Furthermore, the entire washing machine needs to be designed and constructed in an ad hoc manner due to the complexity of such a shock absorber as far as dimensions and construction are concerned.

It would therefore be desirable, and it is actually a main purpose of the present invention, to provide a method capable of effectively, reliably and inexpensively damping the vibrations at the very moment in which they are generated during the operation of the washing machine, even under non-standard conditions.

Another problem that generally needs to be overcome derives from the fact that, in the period of time between final testing at the end of the production line and the installation in the field, washing machines are unavoidably exposed to a number of external stresses, for instance shocks and jerks during transport. The need arises here in particular to prevent or damp bumping the washing assembly of the machines, which, is connected elastically with the outer casing. Now, all systems used by the various machine manufacturers to this particular purpose call for the installation, between the washing assembly and the outer casing of the machine, of appropriate locking means, such as threaded rods, bars, appropriately shaped or contoured shims of corrugated cardboard or expanded polystyrene, which must be removed before the machine is started. Such means are effective but, considering that they really have nothing to do with the actual operation of the machine and that their purpose is scarcely perceived by the consumers, they add in an undesired manner to the overall production costs of a washing machine. In any case, the presence of such locking means in a washing machine may prove quite inconvenient to the users, due not only to their need to be removed from the machine, but also to a substantial impossibility for those parts to be reused in some other different manner, as well as to a difficulty in disposing of these parts.

BRIEF SUMMARY OF THE INVENTION

It would therefore be desirable, and it actually is a further purpose of the present invention, to provide an inexpensive, uncomplicated system that is effective in preventing the washing assembly from bumping against the outer casing during the transport of the washing machine from the factory where it has been manufactured to the site in which it must be installed for use.

These and further aims are reached in a method for damping vibrations generated by the washing assembly, and a washing machine embodying such a method, as described below.

BRIEF DESCRIPTION OF THE SEVERAL VIEWS OF THE DRAWING

By mere way of non-limiting example, a preferred embodiment of the present invention will be described below with reference to the accompanying drawings in which.

DESCRIPTION OF THE INVENTION

Figure 1:
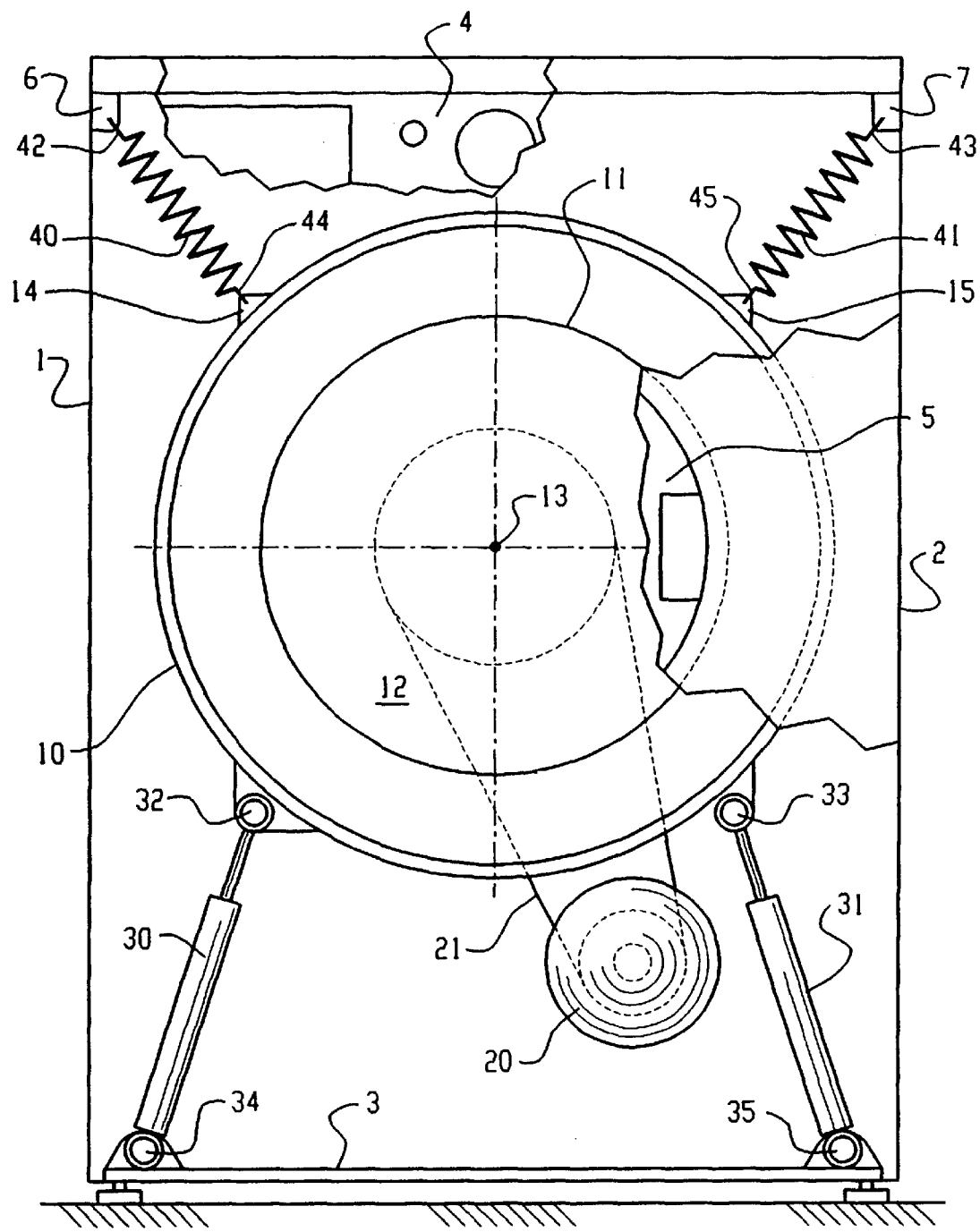
FIG. 1 is a schematic, partially cut-away elevation view of a clothes washing machine according to the present invention.

The following description is only given by way of example, so that it will be appreciated that the scope of the present invention extends to cover both front-loading and top-loading washing machines. As illustrated in FIG. 1, a household-type washing machine of the afore cited kind includes an outer casing, with two side walls 1 and 2, a structural base 3, a control panel 4 and a front porthole-like loading door 5.

A washing assembly of the machine includes a tub 10 and a cylindrically shaped drum 11, whose front aperture 12 for loading and unloading the washload items is closed by the door 5. The drum 11, which is supported by bearings of a rear shaft (not shown), is capable of rotating inside the tub 10 about a substantially horizontal axis 13.

A driving assembly of the machine includes an adjustable-speed electric motor 20 and a drive belt 21, adapted to rotatably drive the drum 11 at at least two different rotational speeds during clothes washing (eg. 60 rpm) and spin-extraction (eg. 1800 rpm), respectively, to ensure that the performance results determined during the design stage of the machine are actually reached according to each single program selected by the user through the proper setting of the controls provided on the control panel 4 of the machine.

The washing assembly is connected to the outer casing of the machine through a pair of suspension springs 40 and 41 exerting, for example, a tractive or pulling action. A first end portion 42 and 43 of each spring is hooked on to ears 6 and 7 that are welded on to the side walls 1 and 2 of the outer casing. A second end portion 44 and 45 of each spring is hooked on to ears 14 and 15 provided at corresponding points of the washing tub 10 located above the rotation axis 13 of the drum 11.

A pair of shock-absorber assemblies 30 and 31 each have a first end portion 32 and 33 hinged on to the washing tub 10 at points located below the rotation axis 13 of the drum 11. The shock-absorber assemblies each have a second end portion 34 and 35 hinged on to the base 3 of the outer casing of the machine.

In this particular embodiment the arrangement of the shock absorbing assemblies 30 and 31 and the springs 40 and 41 is symmetrical with respect to a vertical plane containing the rotation axis 13 of the drum 11; this however is not a limiting feature.

The shock absorbers 30 and 31 are of a known type such as the kind using magnetorheological medium. For example, the shock absorbers are made in accordance with the teachings of the patent U.S. Pat. No. 5,277,281.

Figure 2:
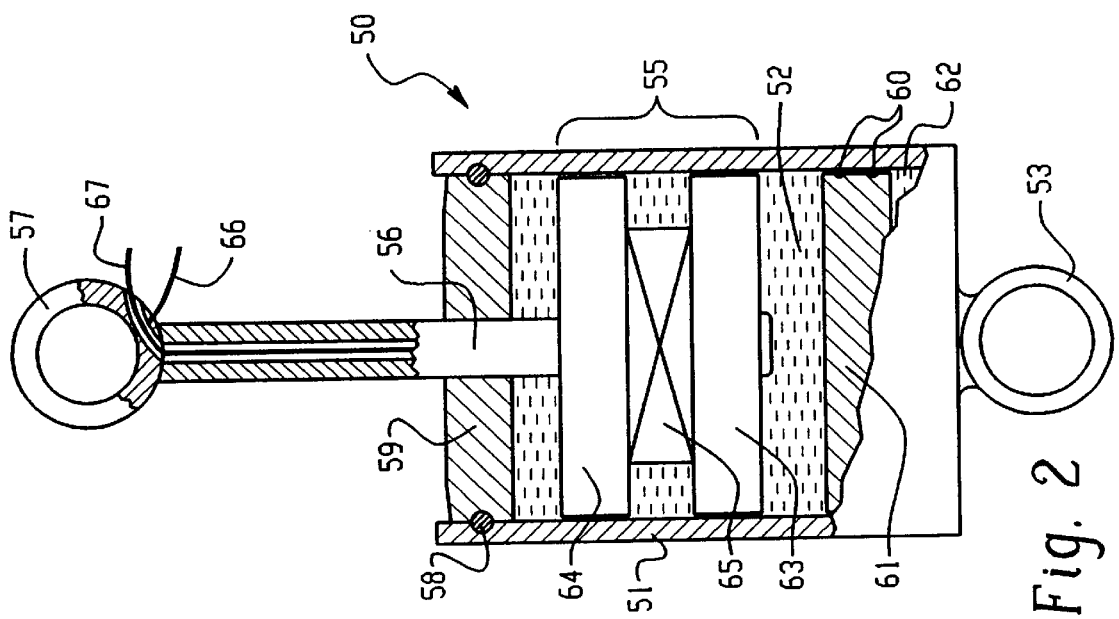
FIG. 2 is a simplified longitudinal-section view of a shock-absorber arrangement for the washing assembly of the clothes washing machine illustrated in FIG. 1.

FIG. 2 shows schematically a shock absorber 50, suitable for use as the shock absorbers 30, 31 in FIG. 1. The shock absorber 50 includes a cylindrical metal housing 51, at the base portion of which there is welded a ring 53 for the attachment of the shock absorber 50 to the base of the washing machine. The housing 51 contains a magnetorheological medium 52, such as silicone oil with iron carbonyl particles in suspension, and is closed on its top portion, by a perimetric sealing ring 58, and a cap 59.

A sliding piston 55 actuated by a rod passes through a ground hole of the cap 59. At a top end portion of the rod, a ring 57 is provided for the attachment of the shock absorber 50 to the tub of the washing machine.

Inside the housing 51, in the lower portion thereof, there is arranged a full-width floating disk 61 that is provided with a pair of perimetric sealing rings 60, wherein a pressure accumulator is thereby defined below said disk 61.

The above cited sliding piston 55 also includes a lower flange 63 and an upper flange 64 (which are manufactured using material with a high magnetic permeability, eg. low-carbon steel), as well as a coil 65 of electromagnetic wire arranged between said flanges 63 and 64. The flanges 63, 64 and the coil 65 are kept together by retaining means (not shown) that are made of a non-magnetic material, eg. brass, and extend parallel to the axis of the metal housing 51.

The coil 65 is connected to with two conductors 66 and 67 that extend along the rod 56. The conductors are kept separated from each other by a bushing (not shown) of an electrically insulating material, eg. epoxy resin. The terminals of said conductors 66 and 67 protrude from the ring 57.

When the coil 65 is energized with electric energy via the conductors 66 and 67, a magnetic field is created inside the housing 51 which reversibly modifies the rheological properties of the medium 52. In particular the field modifies the resistance the medium 52 opposing the displacements of the piston 55 caused by the oscillations of the washing assembly that are transmitted to the shock absorber through the ring 57 and the piston actuating rod 56.

In other words, the density of the flux of the magnetic field that is established inside the housing 51, which is proportional to the intensity of the current and/or the voltage supplied to the coil 65 through the conductors 66 and 67, determines the vibration damping power of the shock absorber 50. The vibration damping power is at a minimum, ie. equal to that of a traditional shock absorber, when no current is flowing in the coil 65.

According to a fundamental feature of the present invention, the current supplied to the coil 65 through the conductors 66 and 67 is the intensity and/or voltage modulated final output of a controller. An initial input to the controller is a signal resulting from monitoring a physical quantity indicative of the balance conditions of the washing assembly. That is, the input signal is representative of the variations in the amplitude of the oscillations generated in said assembly. Said controller works in a real-time manner, ie. instant by instant, throughout the entire operation cycle of the washing machine.

In a preferred embodiment of the present invention, the monitored physical quantity constituting the above cited initial input is an electric current generated by a tachometer, or speedometer, which is associated with the motor 20 that drives the drum 11. The electric current is proportional to the extent by which the actual rotational speed deviates from the speed reference value set during the design stage of the washing machine.

A monitoring concept of this kind is described for instance in FR-A-2 311 883, FR-A-2 489 384, EP-A-0 270 770. However, as opposed to all such prior-art cases, the solution according to the present invention provides for the real-time adjustment of the vibration damping power of each shock absorber to the intervening unbalance of the washing assembly, without any need for either the operation of the machine to be interrupted or the operation cycle of the machine to be brought to conclusion by omitting, or carrying out only partially, some of its phases.

Obviously, the electric current constituting the final output of the method, ie. the current that is supplied to the coil 65 of the sliding piston 55, shall for readily understandable safety reasons have a maximum allowable voltage of 24 Volts and an intensity not exceeding 1 Ampere.

Figure 3:
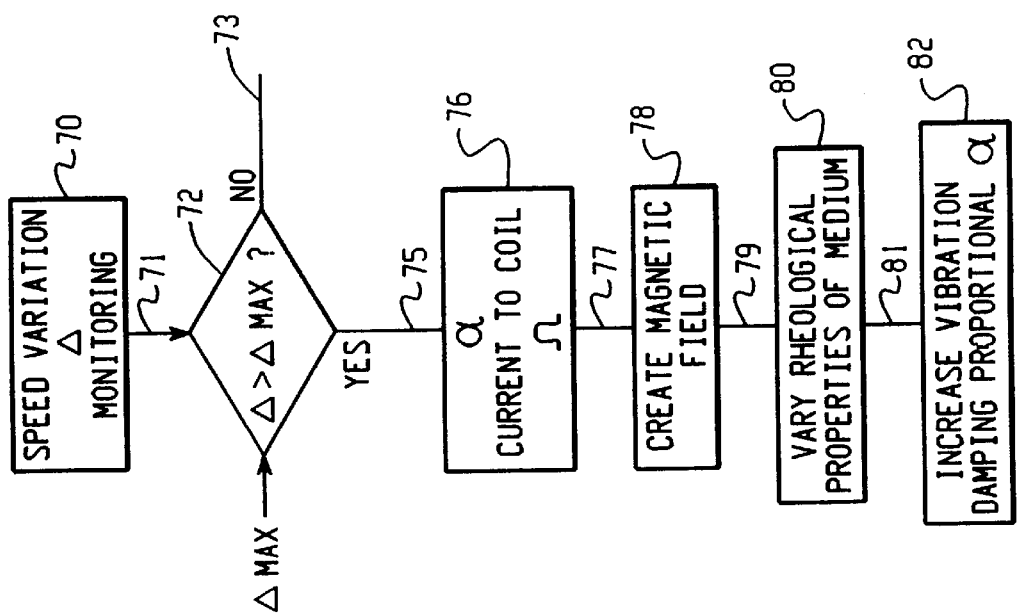
FIG. 3 is a block-diagram flow chart exemplifying the method according to the present invention.

The control method according to the present invention, which, is aimed at producing a real-time damping action to oppose the oscillations generated in the washing assembly of the machine, is schematically illustrated in the block-diagram flow chart shown in FIG. 3. This shows the control scheme for only one of the shock absorbers of a washing machine for simplicity of the description.

In the diagram of FIG. 3, the initial block 70 represents the monitoring of the variation in the actual rotational speed of the drum of the washing machine with respect to a reference speed. A signal Δ, resulting from such monitoring, arrives via line 71 to a control block 72 which represents a phase of comparison of the signal A with a threshold value Δmax that has been pre-determined during the design stage of the washing machine.

As long as, in said phase of comparison 72, the signal Δ is detected to be lower than Δmax (ie. not only during the washing phases of the cycle and as long as the drum rotates at a speed that is lower than the afore cited critical speed, but also during spin-extraction phases if the washload items are distributed evenly along the periphery of the rotating drum 11), there is no intervention (line 73) aimed at modifying the vibration damping power of the shock absorbers which, in the circumstance, operate therefore much as traditional shock absorbers.

When in the same phase of comparison 72 the signal Δ is on the contrary detected to be in excess of Δmax (ie. when, at the beginning of a spin-extraction phase, the washload items are distributed in an uneven, unbalanced manner along the periphery of the rotating drum 11), a signal α is delivered by the control block 72 via the line 75, said signal α having a value that rises proportionally with the difference Δ−Δmax. Said signal α forms the input to the phase which is represented by the block 76 in FIG. 3 and has, as its output Ω, the supply of an electric intensity and/or voltage-modulated (according to what has been established in the design stage of the washing machine) current to the coil 65 of the sliding piston 55.

The result is that the method according to the invention therefore unrolls according to following phases or steps: 78 (creation of a magnetic field inside the housing 51 of the shock absorber 50), 80 (variation in the rheological properties of the medium 52), 82 (increase of the vibration damping power by an extent which is proportional to the input α and, therefore, to the difference Δ−max) via the lines 77, 79 and 81 of the block-diagram flow chart illustrated in FIG. 3.

From the above description it can be clearly inferred that, as opposed to prior-art solutions, the method according to the present invention enables an operation cycle of the washing machine to be obtained in which spin-extraction takes place at the desired rotational speed of the drum for the actual duration set by the program sequence control switch of the machine, even when it proves practically impossible for the washload items to be distributed evenly along the periphery of the rotating drum 11. The proportionally increased vibration damping power of each shock absorber of the machine enables the oscillations generated in the washing assembly to be absorbed in a substantially complete mainer and, as a result, the vibrations emitted outside the washing machine via the ring 53 and the base 3 thereof to be minimized.

It should be further noticed that this result is obtained without any need arising for the washing machine itself to undergo significant modifications in its construction, since the means needed to implement the above cited phases of the method can be integrated in the electronic control and regulation means that are already used in the same machine.

Figure 4:
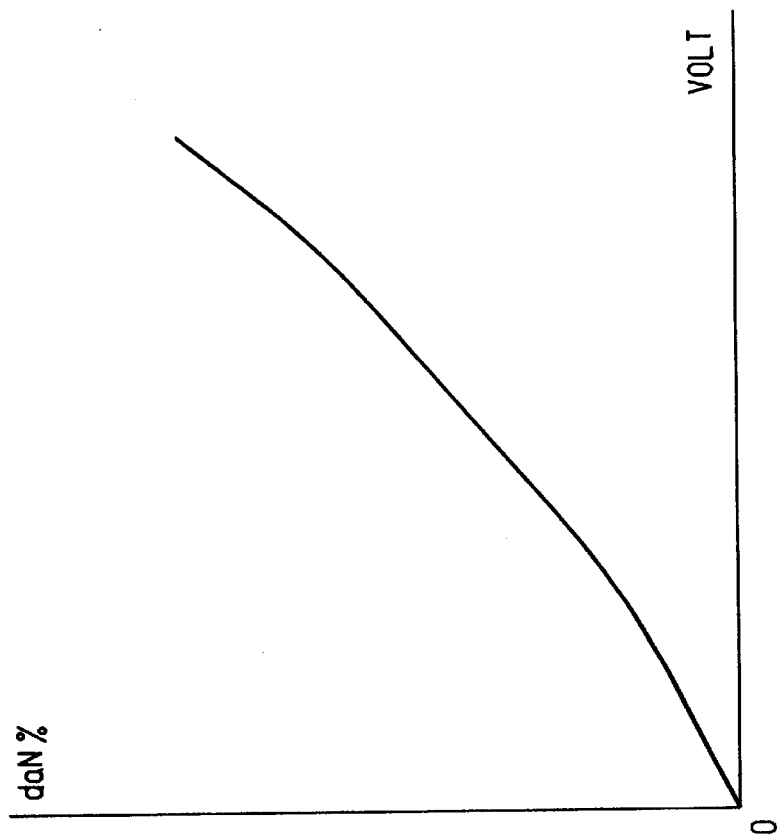
FIG. 4 is a diagrammatical view showing how the vibration-damping power of the shock absorber illustrated in FIG. 2 changes in response to the output of the sequence charted in FIG. 3.

Based on experimental data obtained by the Applicant on a production washing machine, a curve showing the evolution or variation of the vibration damping power of a shock absorber according to the present invention is illustrated in FIG. 4 ("median" instant values between the value measured when the shock absorber operates tractively and the value measured when the shock absorber operates compressively). The abscissa of the diagram shown in FIG. 4 is the modulated voltage of the current supplied to the coil 65 of the sliding piston 55 through the conductors 66 and 67; the ordinate in the diagram is the vibration damping power, as represented by the braking force. The scales of the two physical quantities of the diagram are omitted.

Figure 5:
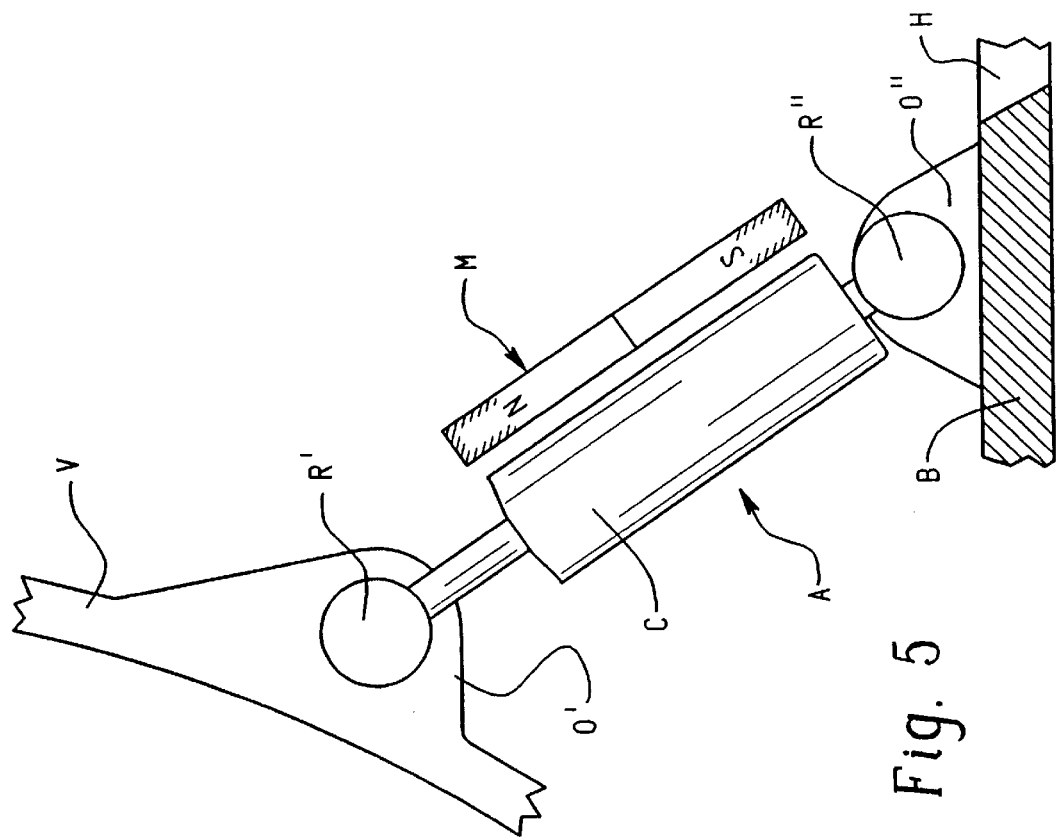
FIG. 5 is a view illustrating how the shock absorber may be equipped to keep the washing assembly blocked in position with respect to the outer casing during transportation of the washing machine shown in FIG. 1 from the factory to the installation site.

Finally, FIG. 5 indicates how, according to a further feature of the present invention, a shock absorber A containing magnetorheological medium is fitted to cope with the problems encountered in the period of time elapsing between the final production-line testing of the washing machine in which the shock absorber is mounted, and the site of installation of the machine in the home of the end user thereof, in this case the upper ring R' of the shock absorber A is attached to an ear 0' provided on the outer surface of a washing tub V, whereas the lower ring R" is attached to an ear 0" provided on the base B of the outer casing of the machine.

A ferrite rod M (which is illustrated as being separated from the housing C merely for clarity) extends along the cylindrical housing C that forms the body of the shock absorber A and is made of a ferromagnetic material. The magnetic flux generated by the ferrite M is sized so as to cause the rheological medium inside the housing C to assume such characteristics as to keep the sliding piston (not shown), which is housed inside the housing C, substantially still, ie. locked in position.

The presence of the ferrite M therefore prevents the tub V, as well as all other parts connected therewith, from entering into contact in any way with the outer casing of the machine until the same ferrite is removed therefrom, through an appropriate aperture H provided in the base B, when the washing machine eventually reaches its site of installation.

As opposed to the afore mentioned traditional locking means, the ferrite M offers the advantage of more convenient, easier handling, even by the end user of the washing machine. It has a further advantage in that it can be reused subsequently and, anyway, is very compact in its dimensions and therefore takes up very little space.

It should finally be pointed out that the scope of this invention extends to cover also possible future developments of the same invention by those skilled in the art, eg. through the use of shock absorbers with a magnetorheological medium having a different construction and/or sensors adapted to monitor other significant physical quantities characterizing the operation or construction of a washing machine. In this connection, use may be made of strain gauges or accelerometers to be appropriately arranged on a significant point of the outer surface of the washing tub 10 or the inner surface of one of the walls of the outer casing of the machine, or again on the bearings of the shaft of the rotating drum. In all cases, the variations of the detected physical quantity will be the input for the variations in the electric current that originates the magnetic field on which the vibration damping power of each shock absorber ultimately depends.

What is claimed is:

1. A method to provide an active vibration damping effect to absorb oscillations generated in a substantially horizontal-axis washing assembly of a washing machine having at least one shock absorber (30, 31; 50; A) containing a magnetorheological medium and arranged between a washing tub (10; V) of the washing assembly and an outer casing (3; B), characterized in that the method includes the following steps carried out in a real-time mode during operation of the machine:

monitoring (70) a physical quantity that is representative of variations in balance conditions of the washing assembly;

producing a first signal ($\Delta$) relating to the monitored quantity;

comparing the first signal with a pre-set reference value ($\Delta$max);

deriving (75), when a condition $\Delta>\Delta$max is detected, an input signal ($\alpha$) that is proportional to $\Delta-\underline{\Delta}$max;

generating (76) a modulated electric current ($\Omega$) carrying the input signal ($\alpha$);

supplying (77) said electric current ($\Omega$) to said shock absorber (50) so as to create (78) in the shock absorber a magnetic field having a flux density proportional to said input signal ($\alpha$) thereby varying (80) at least one of the Theological properties of said medium and, thereby, proportionately increasing (82) vibration damping power of the shock absorber (50).

2. A method according to claim 1, characterized in that said input signal ($\alpha$) is correlated to deviation of an actual rotational speed of a rotating washing drum (11) in the tub (10) from a pre-set reference value.

3. A method according to claim 1, characterized in that said input signal ($\alpha$) is correlated to deviation of an actual rotational speed of a driving motor (20) for a rotating washing drum (11) in the tub (10) from a preset value.

4. A method according to claim 1, characterized in that said input signal ($\alpha$) is correlated to instantaneous accelerations of the washing assembly with respect to the outer casing of the washing machine.

5. A method according to claim 1, characterized in that said input signal ($\alpha$) is correlated to dynamic stresses imposed on a drive shaft of a rotating washing drum (11) in the tub (10).

6. A method according to claim 1, characterized in that, during transport of the washing machine a substantially constant magnetic field is maintained inside said shock absorber (A), said magnetic field having a flux density substantially preventing the washing assembly of the machine from oscillating with respect to the outer casing thereof.

7. A washing machine comprising:

an outer casing (1, 2, 3; B);

a washing assembly with a tub (10) and, inside said tub (10), a drum (11) rotating about a substantially horizontal axis (13);

at least one shock absorber (30, 31; 50; A) containing a magnetorheological medium (52) for connecting the washing assembly to the outer casing;

an electric motor (20) and a belt (21) for driving the rotating drum (11);

integrated means for controlling the electric motor and programming and controlling operation of the machine, characterized in that said integrated means comprise:

means for monitoring in a real-time mode, and throughout the duration of operation cycles of the machine, at least one physical quantity that is representative of variations in balance conditions of the washing assembly;

means for comparing a signal relating to the monitored quantity with a pre-set reference value;

means for deriving, from said comparison, a modulated electric current, and means (65, 66) for supplying said current to means (65) that are adapted to generate inside said shock absorber a magnetic field having a flux density causing a proportionate variation of at least one rheological property of said magnetorheological medium (52).

8. A washing machine according to claim 7, characterized in that, during transport of the washing machine said shock absorber (A) is temporarily fitted with means (M) that are capable of generating a substantially constant magnetic field inside said shock absorber (A), said magnetic field having a flux density capable of substantially blocking oscillations of the washing assembly with respect to the outer casing of the washing machine.

* * * * *

UNITED STATES PATENT AND TRADEMARK OFFICE
CERTIFICATE OF CORRECTION

PATENT NO. : 5,907,880
DATED : June 1, 1999
INVENTOR(S) : Durazzani et al.

It is certified that error appears in the above-identified patent and that said Letters Patent is hereby corrected as shown below:

Column 4, Line 26, delete "perimetric" and insert --perimetral--.

Column 4, ine 34, delete "perimetric" and insert --perimetral--.

Column 5, Line 46, delete "A" and insert --$\Delta$--.

Column 6, Line 11, delete "$\Delta$-max" and insert --$\Delta$-$\Delta$max--.

Column 7, Line 56, Claim 1, delete "Theological" and insert --rheological--.

Signed and Sealed this

Twenty-third Day of November, 1999

Attest:

Q. TODD DICKINSON

Attesting Officer   Acting Commissioner of Patents and Trademarks